United States Patent [19]
Tokoro et al.

[11] Patent Number: 5,822,002
[45] Date of Patent: Oct. 13, 1998

[54] SYNTHESIZED-PICTURE PROJECTING APPARATUS AND PICTURE ADJUSTING METHOD

[75] Inventors: Tomio Tokoro; Masaaki Mitani, both of Tokyo, Japan

[73] Assignees: Sony Corporation; Chromatek, Inc., both of Tokyo, Japan

[21] Appl. No.: 634,202

[22] Filed: Apr. 18, 1996

[30] Foreign Application Priority Data

Apr. 21, 1995 [JP] Japan .................................. 7-119043

[51] Int. Cl.$^6$ ...................................................... H04N 3/22
[52] U.S. Cl. ...................... 348/383; 348/531; 348/588; 348/597; 348/601; 348/747; 348/807
[58] Field of Search ................................ 348/36, 38, 39, 348/113, 121, 383, 278, 501, 502, 511, 523, 531, 564, 584, 588, 601, 569, 673, 678, 687, 745, 625, 597, 747, 806, 807, 734, 594, 595; 345/157, 158; H04N 3/22

[56] References Cited

U.S. PATENT DOCUMENTS

| | | | |
|---|---|---|---|
| 3,833,764 | 9/1974 | Taylor | 348/383 |
| 4,205,346 | 5/1980 | Ross | 348/594 |
| 4,356,511 | 10/1982 | Tsujimura | 348/597 |
| 4,393,394 | 7/1983 | McCoy | 348/601 |
| 5,136,390 | 8/1992 | Inova et al. | 348/745 |
| 5,258,840 | 11/1993 | Miyazaki et al. | 348/531 |
| 5,305,108 | 4/1994 | Trytko | 348/595 |
| 5,602,584 | 2/1997 | Mitsutake et al. | 348/218 |

FOREIGN PATENT DOCUMENTS

| | | | |
|---|---|---|---|
| WO-A-92 08319 | 5/1992 | WIPO | H04N 7/00 |

OTHER PUBLICATIONS

Patent Abstracts of Japan, vol. 014, No. 537 (E–1006), Nov. 27, 1990 & JP-A-02 228180 (Hitachi Denshi Ltd), Sep. 11, 1990.

*Primary Examiner*—John K. Peng
*Assistant Examiner*—Jeffrey S. Murrell
*Attorney, Agent, or Firm*—Frommer Lawrence & Haug LLP; William S. Frommer

[57] ABSTRACT

When two projecting units or more project two pictures or more obtained from video signals and luminance levels of projected pictures at an overlapped portion thereof are adjusted, a picture to be adjusted is selected from the projected pictures. One of processings for adjusting a correction start point of a correction data, a correction end point thereof and an inclination of a correction curve thereof to be used for a picture adjustment is selected. When the positions of a correction start point and/or a correction end point of the correction data are adjusted by using a remote controller unit or the like, a mark data is superposed on the correction start point and/or the correction end point of the correction data to display a mark formed based on the mark data on the screen together with the projected pictures. Thus, the picture is adjusted by displaying the marks together with the projected pictures.

21 Claims, 9 Drawing Sheets

SYNTHESIZED-PICTURE PROJECTING APPARATUS AND PICTURE ADJUSTING METHOD

BACKGROUND OF THE INVENTION

1. Field of the Invention

The present invention relates to a video signal processing apparatus, and more particularly to a synthesized-picture projecting apparatus and a picture adjusting method which are useful when a large-size picture is formed by synthesizing two video signals or more.

2. Description of the Related Art

A display apparatus, such as a television receiver, a monitor apparatus of a computer or the like, for displaying a picture on a tube surface of a cathode-ray tube, a liquid crystal display or the like has been usually used to visually display various kinds of informations. However, a limited size of a display screen of such display apparatus permits a user to watch only a part of a picture which he really wants to watch.

On the other hand, while a projector employing a projecting tube or a liquid crystal plate can reproduce a picture on a large part of eyesight by projecting the picture on a large-size screen, it is generally difficult for such large-size projecting apparatus to reproduce a bright picture as its display screen is larger.

Therefore, a so-called multi-vision type picture projecting apparatus for synthesizing pictures projected by small-size projecting apparatus to project a synthesized picture on a large-size screen is used to reproduce a picture used for producing virtual reality.

Figure 1:
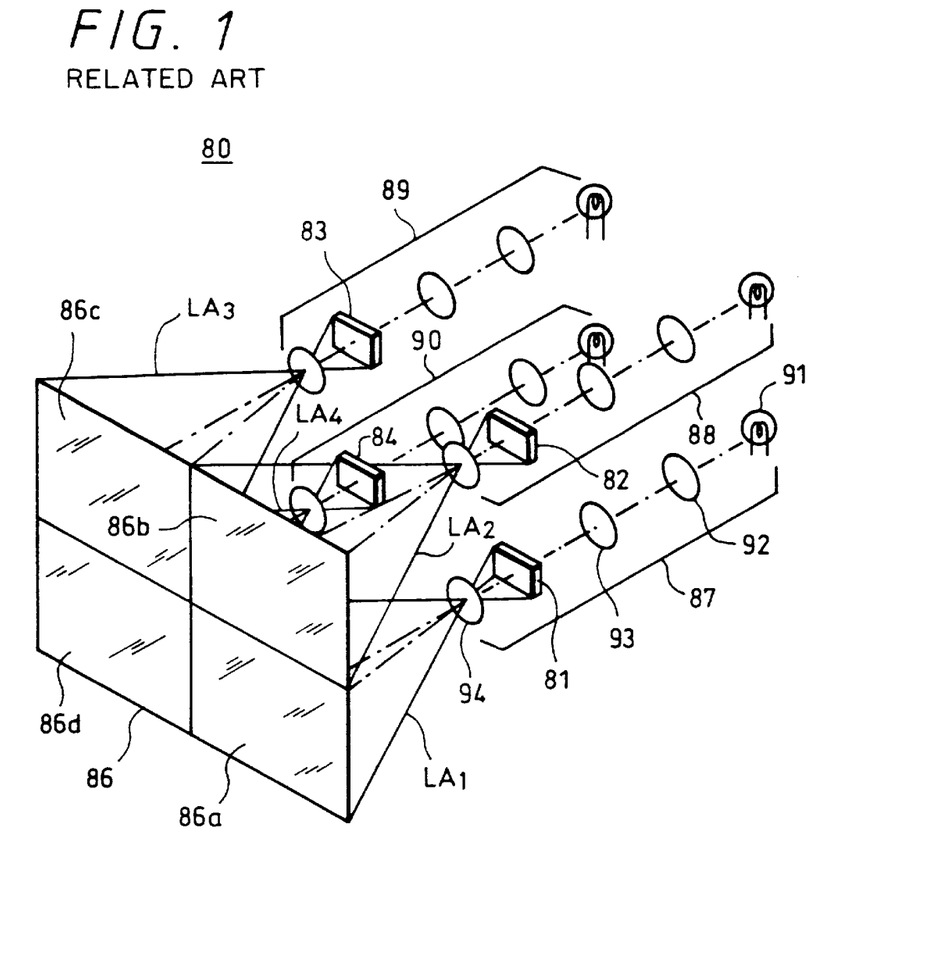
FIG. 1 is a diagram showing an apparatus for projecting a synthesized picture on a screen.

FIG. 1 schematically shows a projecting apparatus in which a plurality of small-size projecting apparatus (liquid crystal projectors) are disposed to form a large-size synthesized picture on a screen. Reference numeral 80 depicts the whole synthesized-picture display apparatus.

A transmission type screen 86 is divided into four screen portions 86a to 86d. Liquid crystal plates 81 to 84 are provided so as to correspond to the respective screen portions 86a to 86d. Rays of light are radiated on the liquid crystal plates 81 to 84, thereby pictures $LA_1$ to $LA_4$ being projected on the screen 86.

Optical systems 87 to 90 each have the same arrangement. The optical system 87, for example, includes a light source 91, a condenser lens 92, a relay lens 93 and a field lens 94. Rays of light emitted from the light source 91 are condensed by the condenser lens 92 and the relay lens 93 onto the liquid crystal plate 81. The liquid crystal plate 81 is energized in response to a supplied video signal to thereby modulate the transmission light therethrough. The transmitted light therethrough is projected through the field lens 94 onto the screen 86a.

Similarly, in each of other optical systems 88, 89 and 90, rays of light which represent a picture and are transmitted through liquid crystal plates 82, 83 and 84 are respectively projected on quartered regions 86b, 86c and 86d of the screen 86. Therefore, a synthesized picture is formed on the screen 86, which can provide a large-size picture display apparatus.

However, such projection-type synthesized-picture projecting apparatus produces a discontinuous line of the picture at a portion where each of the projected picture is adjacent to another projected picture. It is very difficult to position the respective optical systems 87 to 90 for removing such discontinuous lines.

Figure 2A:
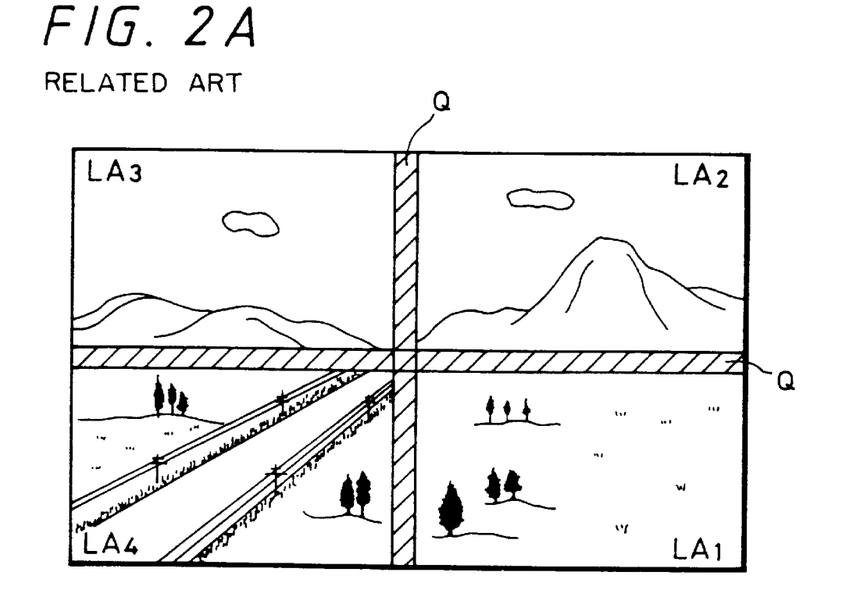
FIG. 2A is diagram showing an overlapped portion of edge portions of quartered synthesized pictures.
Figure 2B:
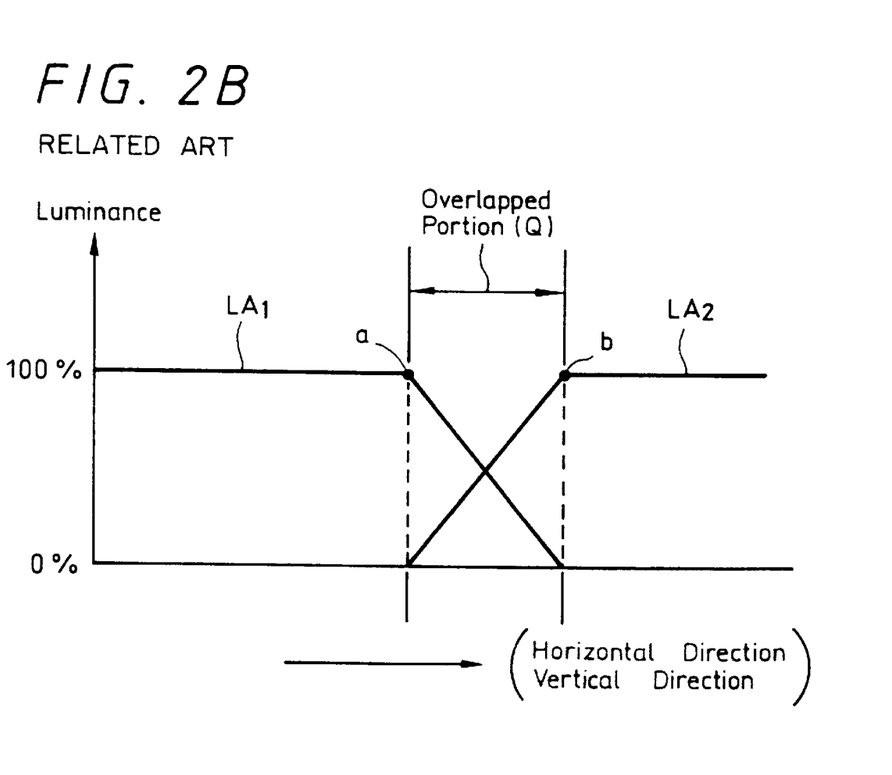
FIG. 2B is a diagram showing a correction characteristic of a video signal.

For this end, as shown in FIG. 2A, the above projecting apparatus projects the picture on the screen so that boundaries between adjacent picture portions $LA_1$ to $LA_4$ to be synthesized on the screen 86 should be overlapped to prevent a synthesized picture projected on the screen 86 from having any clearance therein. Further, the above projecting apparatus adjusts a luminance level of one of video signals for pictures projected on an overlapped region Q. FIG. 2B schematically shows respective luminance levels at the picture portions $LA_1$ and $LA_2$, for example. The projecting apparatus carries out a signal processing so that, as shown in FIG. 2B, a luminance level at the picture portion $LA_1$ should be gently lowered from a point a and a luminance level at the picture portion $LA_2$ should be gently increased toward a point b from its rising point.

Even when the user adjusts the luminance level as described above while watching the picture projected on the screen 86, it is sometimes observed that the user cannot clearly recognize a boundary portion between the overlapped portion Q and a portion other than the overlapped portion Q. Therefore, it is difficult for the user to find and determine an adjustment point, which requires a considerable time for the adjustment.

When the user adjusts the luminance level by using a personal computer or the like, the adjustment requires a picture adjustment software corresponding to the computer which the user is using for the adjustment.

When a condition such as a limited location space or the like prevents an adjustment devices such as a picture adjusting apparatus, a personal computer or the like from being disposed at an optimum place for the user's monitoring a synthesized picture projected on the screen 86, the user must go back and forth between the adjustment device and the optimum place for visual confirmation of the projected picture many times in order to confirm a synthesized result of the projected pictures. It only provides unsatisfactory efficiency in adjustment.

SUMMARY OF THE INVENTION

In view of such aspects, it is an object of the present invention to provide a synthesized-picture projecting apparatus and a picture adjusting method which facilitates an operation of adjusting a picture, improves efficiency in the adjustment, provides a precise adjustment of the picture, and provides an easy, speedy operation of the adjustment.

According to a first aspect of the present invention, a synthesized-picture projecting apparatus includes a video signal processing unit and two projecting units or more for projecting on a screen pictures obtained from two video signals or more formed by the video signal processing unit. The video signal processing unit includes a synchronizing signal separation unit for extracting a synchronization information of an input video signal, a frequency measuring unit for detecting a horizontal synchronizing frequency of the input video signal from the synchronization information, a memory unit for storing a correction data used for correcting at least a video signal of one horizontal scanning line amount corresponding to the horizontal synchronizing frequency, a correction data calculating unit for calculating a correction data having a correction start point and/or a correction end point at predetermined positions in response to the horizontal synchronizing frequency, a mark data generating unit for superposing a mark data used for displaying marks representing the correction start point and/or the correction end point on the correction start point and the correction end point of the correction data, and an operation unit for supplying a command to read the correction data for a picture adjustment. When positions of the correction start point and/or the correction end point of the correction data are adjusted by operating the operation unit, the mark data is superposed on the correction start point and/or the correction end point of the correction data, thereby the mark together with a projected picture being displayed on the screen.

The operation unit is formed of a remote operating unit connected to the video signal processing unit.

According to a second aspect of the present invention, when the two projecting units or more projects two pictures or more obtained from video signals and projected pictures at an overlapped portion thereof are adjusted, a picture to be adjusted is selected from the projected pictures. One of processings for adjusting a correction start point of a correction data, a correction end point thereof and an inclination of a correction curve thereof to be used for a picture adjustment is selected. A mark data is superposed on a correction start point and/or a correction end point of the correction data to display a mark formed based on the mark data on the screen together with the projected pictures.

DESCRIPTION OF THE PREFERRED EMBODIMENT

An outline of a synthesized-picture projecting apparatus to which the present invention is applied will be described with reference to FIG. 3.

Figure 3:
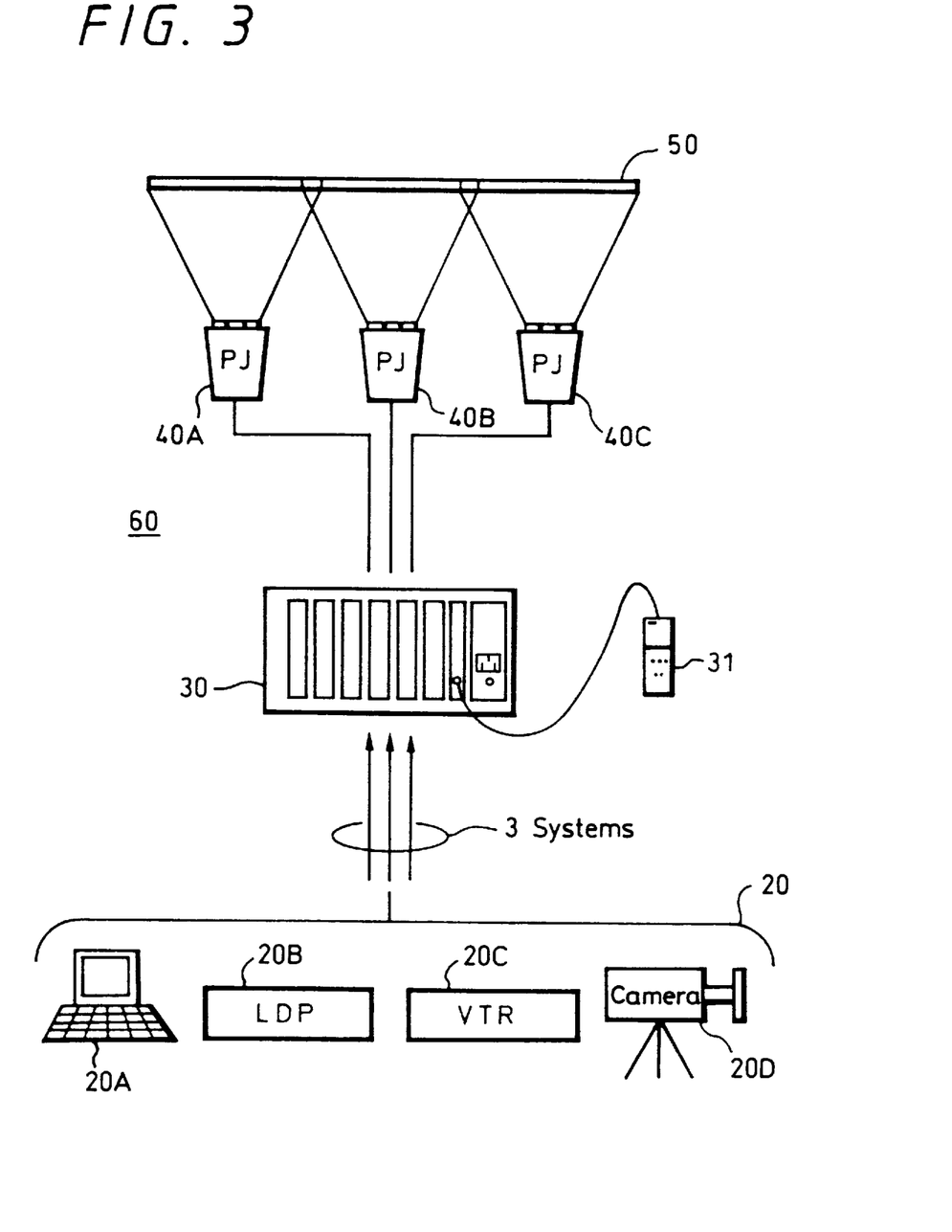
FIG. 3 is a schematic diagram showing a synthesized-picture projecting apparatus according to an embodiment of the present invention.

As shown in FIG. 3, a video signal source (multi-screen signal source) 20 used for displaying a synthesized picture includes a computer 20A, a laser disk player (LDP) apparatus 20B, a video tape recorder (VTR) 20C, a video camera 20D or the like, for example. The picture signal source 20 outputs, for example, a pictorial information from the computer 20A, a multi-picture data from the laser disk apparatus 20B, a reproduced video signal from the VTR 20C, a video signal obtained by picking up an image of an object and output directly from the video camera 20D, etc. as video sources.

A single video signal output from the VTR 20C, the laser disk player apparatus 20B or the like is once stored in the computer 20A as a picture data. The computer 20A processes the video signal to obtain a plurality of video signals for multi screens, and outputs them as R, G, B component signals. In this case, synchronization information may be superposed on a G component signal, for example, or the synchronization information may be derived through a dedicated cable as another signal.

The multi-screen video signal output from the video signal source 20 is preferably supplied as the R, G, B component signals to a soft edge matching apparatus 30 (hereinafter referred to as an SEM apparatus) of the synthesized-picture projecting apparatus 60. The SEM apparatus 30 is the signal processing apparatus according to the present invention. The SEM apparatus 30 carries out the above signal processing which, when a synthesized picture is projected as described above, makes pictures continuous at a joint portion thereof. Then, the SEM apparatus 30 supplies the signals to a synthesized-picture projecting apparatus 60 having three projecting apparatus 40A, 40B, 40C for respectively projecting pictures on left side of the screen 50, at the center thereof and on the right side thereof. The synthesized-picture projecting apparatus 60 includes the above three projecting apparatus 40A, 40B, 40C, the SEM apparatus 30 and a remote controller unit 31.

When a user operates various operation keys provided in the remote controller unit 31 as a remote operating unit connected to the SEM apparatus 30, the SEM apparatus 30 carries out the above signal processing in accordance with a command from the remote controller unit 31. The remote controller unit 31 will be described in detail with reference to FIG. 6.

The three projecting apparatus 40A, 40B, 40C have high-luminance cathode-ray tubes (CRTS) which have been employed as projectors and which convert the video signals into projected pictures to be projected, thereby the synthesized picture being projected on the rectangular screen 50. The projecting apparatus 40A, 40B, 40C may be formed of liquid crystal projectors.

While in this embodiment the three projecting apparatus 40A, 40B, 40C are disposed in the horizontal direction, the present invention is not limited thereto and the signal processing apparatus according to the present invention can be applied to a synthesized-picture projecting apparatus having two projecting apparatus or more. The following embodiment will be described on the assumption that a joint portion in a synthesized picture is processed by using two pictures.

Figure 4:
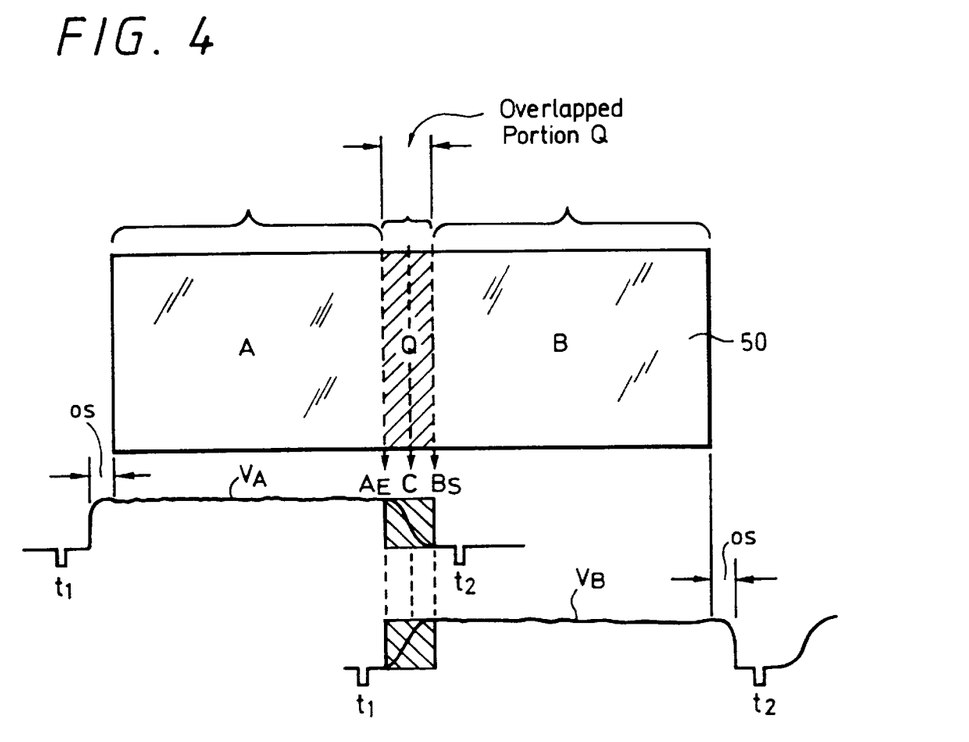
FIG. 4 is a diagram used to explain a synthesized picture projected on a screen.

FIG. 4 is a diagram used to explain a synthesized picture which is obtained by synthesis of two pictures A, B and is to be displayed. FIG. 4 shows how to synthesize the two pictures A, B projected on the screen 50.

Edge or boundary portions of the pictures A, B are made as overlapped portions Q where the two pictures are overlapped each other. The signal is processed on the video signal source 20 side so that the overlapped portions Q of the picture A and the picture B should be synthesized as the same and continuous picture. Specifically, as shown in FIG. 4, a hatched portion of a video signal $V_A$ slanting down to the right from a correction start point $A_E$ and a hatched portion of a video signal $V_B$ rising to the right and toward a correction end point $B_S$ have the picture informations having the same contents. The video signals $V_A$ and $V_B$ are respectively processed so as to have fade-out and fade-in characteristics in which luminance levels of these portions between the correction start point $A_E$ and the correction end point $B_S$ are gradually lowered and increased as shown by curves in FIG. 4.

According to the present invention, as will be described later on, marks are displayed on portions of a screen corresponding to, for example, the correction start point $A_E$ and the correction end point $B_S$, which facilitates adjustment of the picture on the screen.

Accordingly, when the SEM apparatus 30 carries out such signal processing and the two projecting apparatus 40A, 40B, for example, project pictures on the screen 50, the luminance at the overlapped portion Q on the screen 50 is set same as that of the picture A and that of the picture B. Therefore, both of the pictures A, B can be synthesized so that a viewer can seldom notice a boundary portion between the pictures A and B.

If the video signal $V_A$ and the video signal $V_B$ are processed so that a left edge of the video signal $V_A$ and a right edge of the video signal $V_B$ should be set as overscanning portions OS, edges of the pictures A, B can be prevented from being displayed at both ends of the screen 50, respectively.

Figure 5:
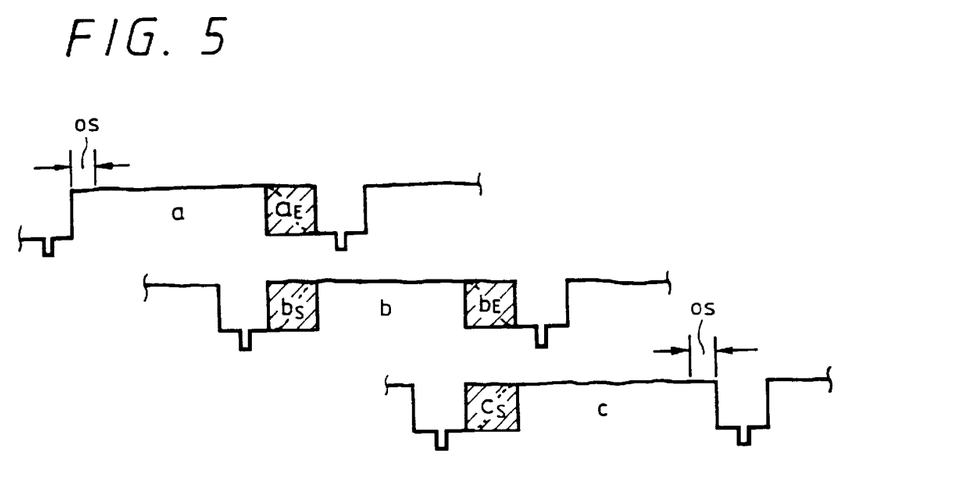
FIG. 5 is a diagram showing signal waveforms used when video signals of three systems are synthesized.

When a synthesized picture is displayed by the three projecting apparatus 40A, 40B, 40C, as shown in FIG. 5, respective video signals a, c (FIG. 5 shows only one horizontal period from $t_1$ to $t_2$ of each of the video signals) for left and right pictures are processed similarly to the video signals $V_A$ and $V_B$ shown in FIG. 4. However, a video signal b for a center picture is processed so that an end portion $a_E$ of the video signal a and a start portion $b_S$ of the video signal b should have the same contents. Further, the video signal b is processed so that an end portion $b_E$ of the video signal b and the start portion $c_S$ of the video signal c should have the same contents. In the video signal b, an end point of the start portion $b_S$ and a start point of the end portion $b_E$ are respectively set as a correction end point and a correction start point. Specifically, when three pictures or more are synthesized to form a synthesized picture, both of the correction end point and the correction start point are set in each of corrected signals of pictures other than pictures to be projected at both ends of the screen 50.

These portions between the correction start point and the correction end point of the video signals a, b, c are subjected to a fade-out processing and a fade-in processing. Thus, the edge portions of the projected pictures which cause two boundary portions of the synthesized picture obtained by synthesizing three pictures are corrected.

Figure 6:
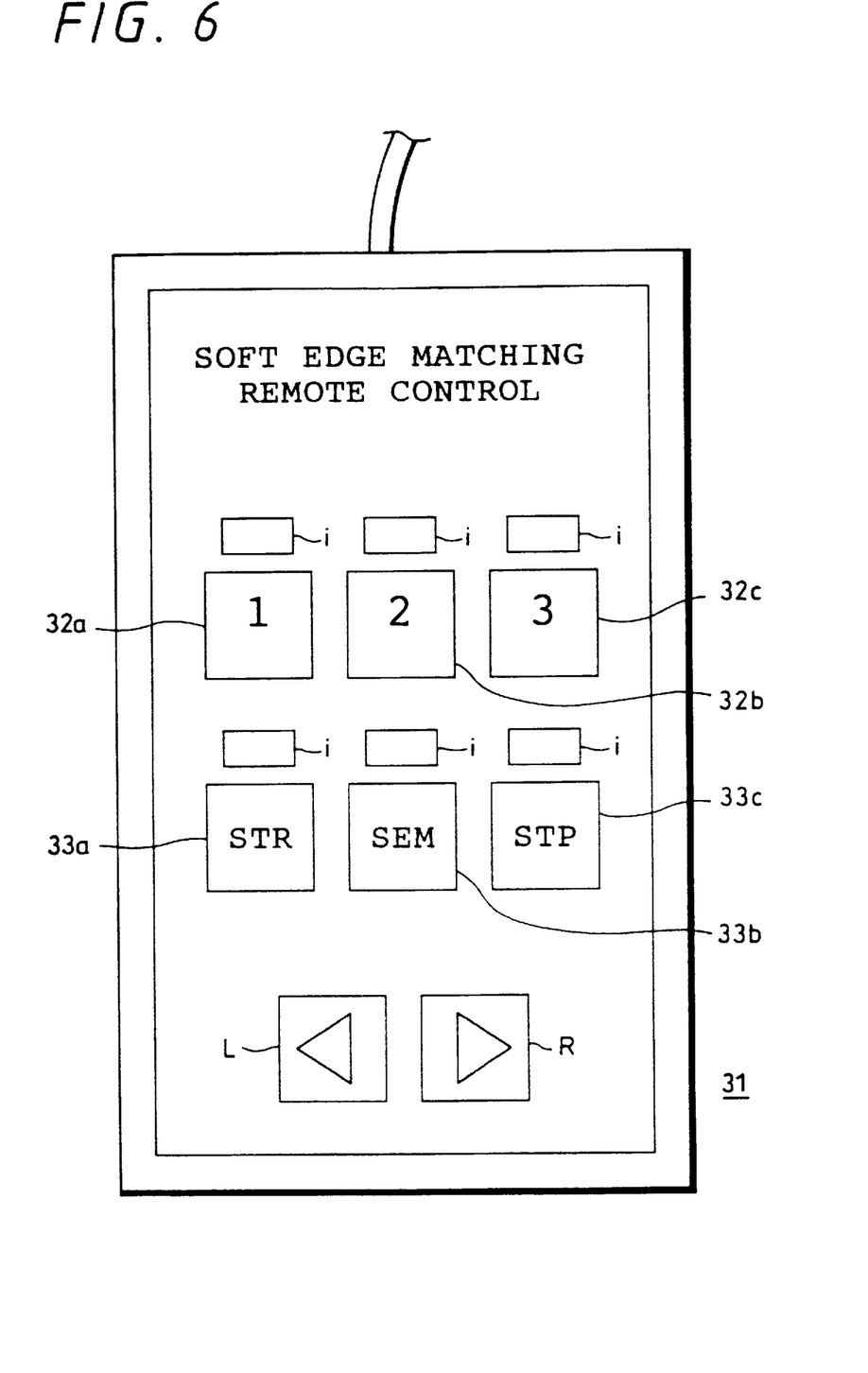
FIG. 6 is a diagram showing a remote controller unit of a soft edge matching (SEM) apparatus according to the embodiment.

Functions of various operation keys provided in the remote controller unit 31 will be described with reference to FIG. 6.

The remote controller unit 31 is a remote commander used to adjust a width of the overlapped portion Q, positions of the correction start point $A_E$ and the correction end point $B_S$ and so on shown in FIG. 4 when the three-system video signals are synthesized to form a large-size picture. Various commands input by the remote controller unit 31 are input through a dedicated connection cable to the SEM apparatus 30.

The remote controller unit 31 is provided with the operation keys such as a picture selection key group 32a, b, c, an SEM selection key group 33a, b, c, movement-direction selection keys L, R, and so on. Near respective operation keys of the picture selection key group 32a, b, c, and the SEM selection key group 33a, b, c, selection indicators i are provided, and each of the selection indicators i is turned on while the operation key disposed adjacent thereto is selected.

While the picture selection key group 32a, b, c, includes three picture selection keys 32a, 32b, 32c for the left, center and right pictures shown in FIG. 3, the picture selection keys are practically provided so as to correspond to the number of the pictures to be displayed.

The picture selection keys 32a, 32b, 32c are used to select the pictures to be subjected to the above various adjustments. When the picture selection key 32a, for example, is selected, the left picture to be projected by the projecting apparatus 40A shown in FIG. 3 is selected. Similarly, when the picture selection keys 32b, 32c are selected, the center picture and the right picture are selected, respectively.

The SEM selection key group 33a, b, c, includes operation keys for selecting the SEM processing, i.e., a start-point selection key 33a, an SEM selection key 33b, and an end-point selection key 33c. When the start-point selection key 33a is operated, a mode is changed to a mode for adjusting the position of the correction start point $A_E$ of the SEM processing shown in FIG. 4. When the SEM selection key 33b is operated, the mode is changed to a mode for adjusting inclinations of the luminance levels of the video signals $V_A$, $V_B$ at the overlapped portion Q. When the end-point selection key 33c is operated, the mode is changed to a mode for adjusting the position of the correction end point $B_S$ of the SEM processing.

The movement-direction selection keys L, R are used to execute the adjustment selected by using the SEM selection key group 33a, b, c. For example, with use of these movement-direction selection keys L, R, the positions of the correction start point $A_E$ and the correction end point $B_S$, shown in FIG. 4, of the SEM processing are moved in the left and right direction and the inclination of the luminance levels of the video signals $V_A$, $V_B$ at the overlapped portion Q becomes sharp and slow.

The above adjustment will be described by way of example on the assumption that the pictures A and B shown in FIG. 4 are respectively left and right pictures.

After the picture selection key 32a is operated to select the picture A, the start-point selection key 33a is operated to select adjustment of the correction start point $A_E$. When the movement-direction selection key L is operated, the correction start point $A_E$ is shifted toward the left side, and when the movement-direction selection key R is operated, the correction start point $A_E$ is shifted toward the right side. During this adjustment, the inclination of the luminance level at the right end of the video signal $V_A$ is not changed and hence shifted in parallel.

Subsequently, the picture selection key 32c is operated to select the picture B. Through the similar operation, the correction end point $B_S$ of the picture B is shifted to the left or right side. Thus, the width of the overlapped portion Q between the correction start point $A_E$ and the correction end point $B_S$ is adjusted.

When the width of the overlapped portion Q is changed, for example, the SEM selection key 33b is selected to adjust the inclinations of the luminance levels of the video signals $V_A$, $V_B$ at the overlapped portion Q.

In this case, the inclinations are adjusted so that the correction start point $A_E$ of the video signal $V_A$ and the correction end point $B_S$ of the video signal $V_B$ should be a rising point of the video signal $V_B$ and a falling point of the video signal $V_A$, respectively. Specifically, if the width of the overlapped portion Q (a width of a portion where the pictures A, B are overlapped each other) is narrow, then the inclinations are sharp curves. If the width is wide, then the inclinations are slow curves.

The various operation keys provided in the remote controller unit 31 may be provided in the SEM apparatus 30 as its operating unit.

Figure 7:
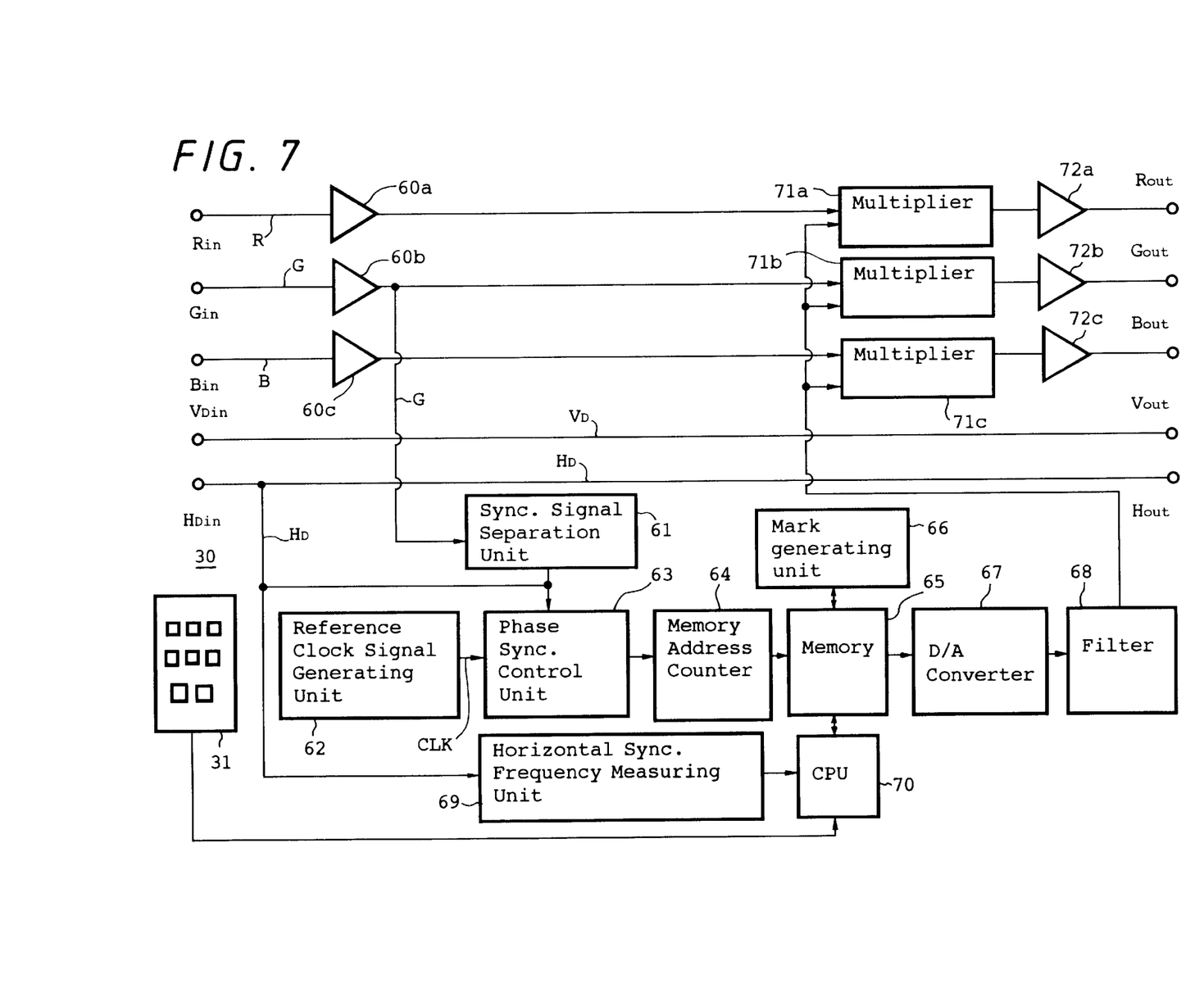
FIG. 7 is a diagram showing a part of a circuit block of the SEM apparatus according to the embodiment.

FIG. 7 is a diagram showing a part of a circuit block of the SEM apparatus 30 for processing the signal corresponding to the overlapped portion Q.

While FIG. 7 shows a circuit block for only one-system video signal which is a circuit block of one of the projecting apparatus 40A, 40B, 40C shown in FIG. 3, a plurality of input/output systems are practically provided so as to correspond to the number of the provided projecting apparatus.

Video signal input terminals $R_{in}$, $G_{in}$, $B_{in}$ are supplied with video signals from the video source of the video signal source 20 shown in FIG. 3 (e.g., the computer 20A, the laser disk player apparatus 20B, etc.).

Respective video signals R, G, B which are input to the video signal input terminals $R_{in}$, $G_{in}$, $B_{in}$ and correspond to red, green and blue are clamped by buffer amplifiers 60a, 60b and 60c. Multipliers 71a, 71b, 71c described later on adjust luminance levels of the clamped video signals R, G, B which are then output to video signal output terminals $R_{out}$, $G_{out}$, $B_{out}$, respectively.

The respective video signals R, G, B output from the video signal output terminals $R_{out}$, $G_{out}$, $B_{out}$ are supplied to the projecting apparatus 40A, 40B, 40C which are not shown in FIG. 7.

A horizontal synchronizing signal input terminal $H_{Din}$, and a vertical synchronizing signal input terminal $V_{Din}$ are terminals to which horizontal and vertical synchronizing signals $H_D$ and $V_D$ that have been separated from the video signals are input as it is carried out in a field of computer graphics or the like. The vertical synchronizing signal $V_D$ input thereto is output from a vertical synchronizing signal output terminal $V_{out}$ as it is. The horizontal synchronizing signal $H_D$ is output from a horizontal synchronizing signal output terminal $H_{out}$ and also supplied to a phase synchronization control unit 63.

If the synchronizing signals are superposed on the video signal G input from the video input terminal $G_{in}$, then a synchronizing signal separation unit 61 is supplied with the video signal G and extracts the horizontal and vertical synchronizing signals therefrom.

The synchronizing signal separation unit 61 extracts the supplied horizontal synchronizing signal superposed on the video signal G, for example, therefrom and supplies the extracted horizontal synchronizing signal to a phase synchronization control unit 63 (manufactured by Krayus Co. under the tradename of KS6369) and a horizontal synchronizing frequency measuring unit 69 which will be described later on.

A reference clock generating unit 62 is formed of a crystal oscillator or the like and outputs a clock signal CLK having a fixed frequency of 40 MHZ regardless of the input synchronizing signals.

The phase synchronization control unit 63 is input with the horizontal synchronizing signal $H_D$ supplied from the horizontal synchronizing signal input terminal $H_{Din}$ or the synchronizing signal separation unit 61 and locks a phase of the clock signal CLK of 40 MHz supplied from the reference clock signal generating unit 62 with reference to the input horizontal synchronizing signal $H_D$. This phase locking prevents a correction jitter of an output picture (in this case, a phase of a pulse of the clock signal CLK is irregularly fluctuated relative to the horizontal synchronizing signal $H_D$, which results in fluctuation in luminance of the output picture).

Since an accuracy of the clock signal CLK directly influences a quality of the output picture, the reference clock signal generating unit 62 is preferably formed of the crystal oscillator or the like which is superior in both accuracy and stability as compared with a phase lock loop (PLL) circuit. The reference clock signal generating unit 62 which can realize such requirement can be formed of a transistor-transistor logic (TLL) crystal oscillator or the like.

An address counter 64 is a counter used for reading out data stored in a memory (RAM) 65 provided at the succeeding stage based on the clock signal CLK supplied from the phase synchronization control unit 63. The address counter 64 is used to read out correction data of one horizontal period from the memory 65 based on 12-bit address data.

Figure 8A:
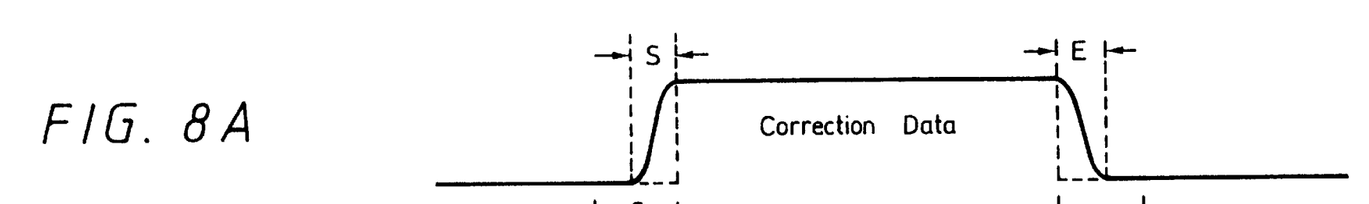
FIGS. 8A and 8B are schematic diagrams respectively showing rising and falling portions of a correction data.
Figure 8B:
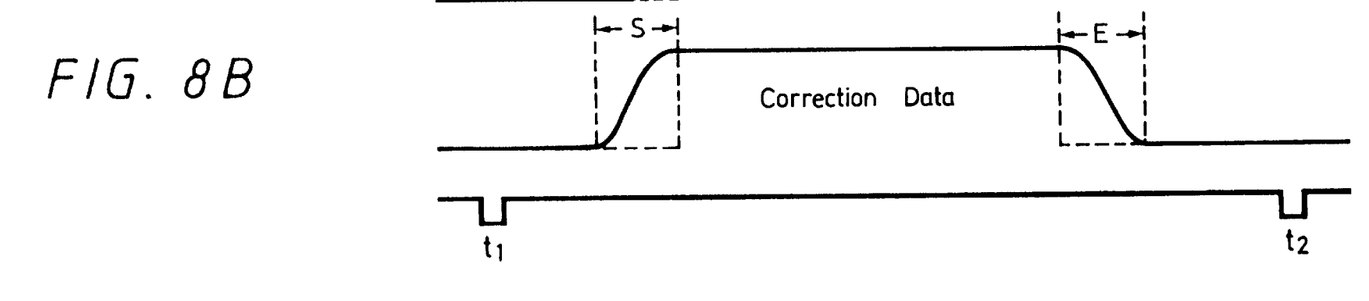

The memory 65 stores correction data which is previously set by a central processing unit (CPU) 70 and used to process the video signal corresponding to the overlapped portion Q, i.e., correction data for permitting the luminance level of the video signal to gradually rise at a correction start region S like cosine curve and to gradually fall at a correction end region E like a cosine curve as shown in FIGS. 8A and 8B. The memory 65 outputs the correction data during a period corresponding to the overlapped portion Q shown in FIG. 4 (a period between the correction start point $A_E$ and the correction end point $B_S$). While in this embodiment the above correction data is an 8-bit data and a read cycle is set to 25 ns, these values can be changed in view of a storage capacity and a price of the memory.

In this embodiment, since the frequency of the reference clock signal CLK is fixed (i.e., 40 MHz), the read cycle is constant regardless of the horizontal frequency of the input video signal. Therefore, a D/A converter 67 and a filter (a smoothing filter with a cut-off frequency of 20 MHZ) 68 provided at the succeeding stage can have a certain characteristic regardless of the horizontal frequency of the input video signal, which leads to simplification of the signal processing circuit.

When the video signal having the horizontal frequency of, for example, 15 KHz is input to the SEM apparatus 30, the video signal is processed by the correction data having the sampling number of about 2667 in one horizontal period. When the video signal having the horizontal frequency of, for example, 93 KHz is input thereto, the video signal is processed by the correction data having the sampling number of about 431 in one horizontal period. Accordingly, in this embodiment, the SEM apparatus 30 includes a detection unit for detecting the horizontal frequency of the input video signal, i.e., the horizontal synchronizing frequency measuring unit 69. When the video signals of different systems are synthesized to project the synthesized picture, contents of the correction data (stored address) stored in the memory 65 are changed in accordance with the horizontal frequency of the input video signal detected by the horizontal synchronizing frequency measuring unit 69. The correction data is always read out from the memory 65 in a constant cycle and supplied to the multipliers 71a, 71b, 71c. The multipliers 71a, 71b, 71c process portions of the video signals corresponding to the overlapped portion Q with the supplied correction data.

A mark generating unit 66 stores mark data used to display on the screen 50, for example, a white mark used as an indicator for adjusting a rising end point and a falling start point of a curve indicative of an SEM correction when the SEM processing is carried out by using the remote controller unit 31 described with reference to FIG. 6, for example. The mark generating unit 66 may be provided in the CPU 70 which will be described later on.

Figure 9:
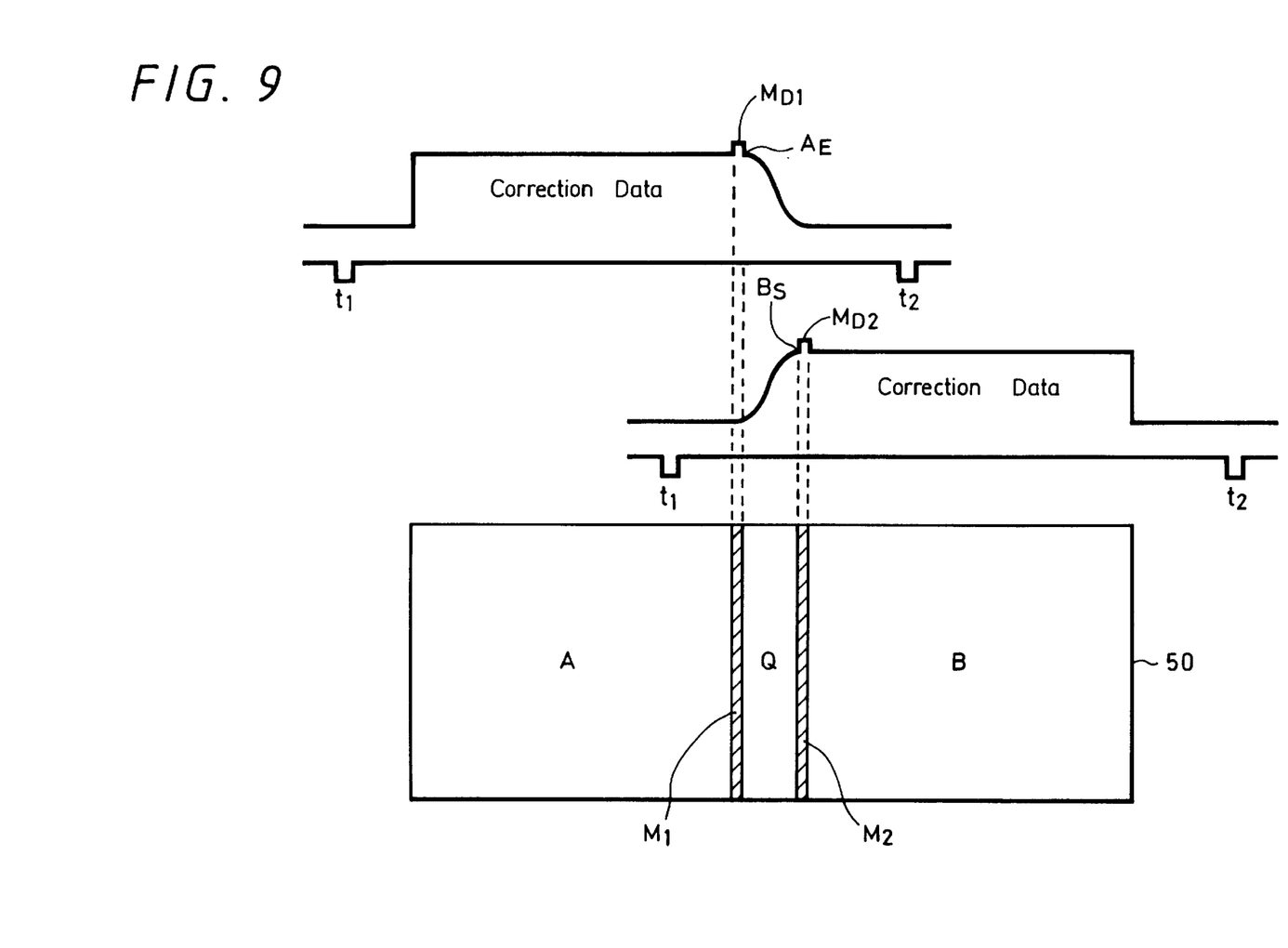
FIG. 9 is a schematic diagram showing a mark data superposed on portions of a correction data corresponding to a correction start point and a correction end point.

When the correction start point $A_E$ and the correction end point $B_S$ are adjusted by operating the remote controller unit 31, as shown in FIG. 9, the mark generating unit 66 generates mark data $M_{D1}$, $M_{D2}$ for setting luminance levels of the correction data at the correction start point $A_E$ and the correction end point $B_S$ to a luminance level which is, for example, about 1.15 (115%) times as high as that of the input video signal.

Every time the movement-direction selection keys L, R are operated to adjust the correction start point $A_E$ and the correction end point $B_S$, the mark data $M_{D1}$, $M_{D2}$ are changed by changing points where the mark data $M_{D1}$, $M_{D2}$ are superposed, i.e., addresses of the memory 65.

When the mark data $M_{D1}$, $M_{D2}$ are superposed on the correction data, the luminance levels of the correction start point $A_E$ and the correction end point $B_S$ are increased. As a result, for example, white marks $M_1$, $M_2$ are displayed on the screen 50 at the correction start point $A_E$ of the picture A and the correction end point $B_S$ of the picture B, i.e., positions corresponding to the mark data $M_{D1}$, $M_{D2}$. Every time when the movement-direction selection keys L, R of the remote controller unit 31 are operated, the marks $M_1$, $M_2$ are moved on the screen 50 in the horizontal direction. The marks $M_1$, $M_2$ are displayed with each having a width that is about 0.5% of the whole width of the projected picture (i.e., a period between the horizontal synchronizing signals).

While the mark $M_1$ for the picture A and the mark $M_2$ for the picture B are displayed simultaneously in this embodiment for convenience sake, the present invention is not limited thereto and modifications can be effected; a mark can be displayed on only a picture being adjusted (either of the pictures A, B).

The marks $M_1$, $M_2$ may be set such that they are displayed on the screen 50 when some operation key of the SEM selection key group 33 is operated and such that they are erased immediately after the movement-direction keys L or R, for example, is turned off or after a predetermined time period (e.g., about three seconds) passes after it is turned off. Alternatively, the remote controller 31 may includes a key dedicated for displaying and erasing the marks $M_1$,, $M_2$.

Moreover, a displayed color of the marks $M_1$, $M_2$ may be any other color than white as long as the display color is easy for the user to recognize on the screen.

Returning back to FIG. 7, the SEM apparatus 30 will be described again.

The D/A converter 67 converts the digital correction data read out from the backup memory 65 into an analog correction signal and supplies the analog correction signal to the filter 68. The filter 68 smooths the analog correction signal into which the D/A converter 67 has converted the correction data and supplies the analog correction signal to the multipliers 71a, 71b, 71c as luminance correction signals.

The horizontal synchronizing frequency measuring unit 69 measures the frequency of the horizontal synchronizing signal $H_D$ supplied from the synchronizing signal separation unit 61 or the horizontal synchronizing signal input terminal $H_{Din}$ and supplies a measured result thereof to the CPU 70.

The CPU 70 controls the above circuits and units for executing their functions, and has an arithmetic means for, when the frequency of the input horizontal synchronizing signal $H_D$ is changed, calculating an optimum correction data for forming an optimum curve of the luminance level in response to the horizontal synchronizing signal $H_D$.

When a control command to carry out the SEM processing is input to the SEM apparatus 30 from the remote controller unit 31, the SEM control unit 30 carries out the above-mentioned control processing of superposing the mark data described with reference to FIG. 9 on the above correction curve data.

The multipliers 71a, 71b, 71c respectively multiply the video signals R, G, B input from the video input terminals $R_{in}$, $G_{in}$, $B_{in}$ with the analog correction signal (i.e., the luminance correction signal) output from the filter 68, thereby setting the video signals R, G, B so as to have predetermined luminance levels. The multipliers 71a, 71b, 71c supplies the video signals R, G, B through buffer amplifiers 72a, 72b, 72c to the vide output terminals $R_{out}$, $G_{out}$, $B_{out}$ and then to the projecting apparatus 40A, 40B, 40C shown in FIG. 3.

Figure 10:
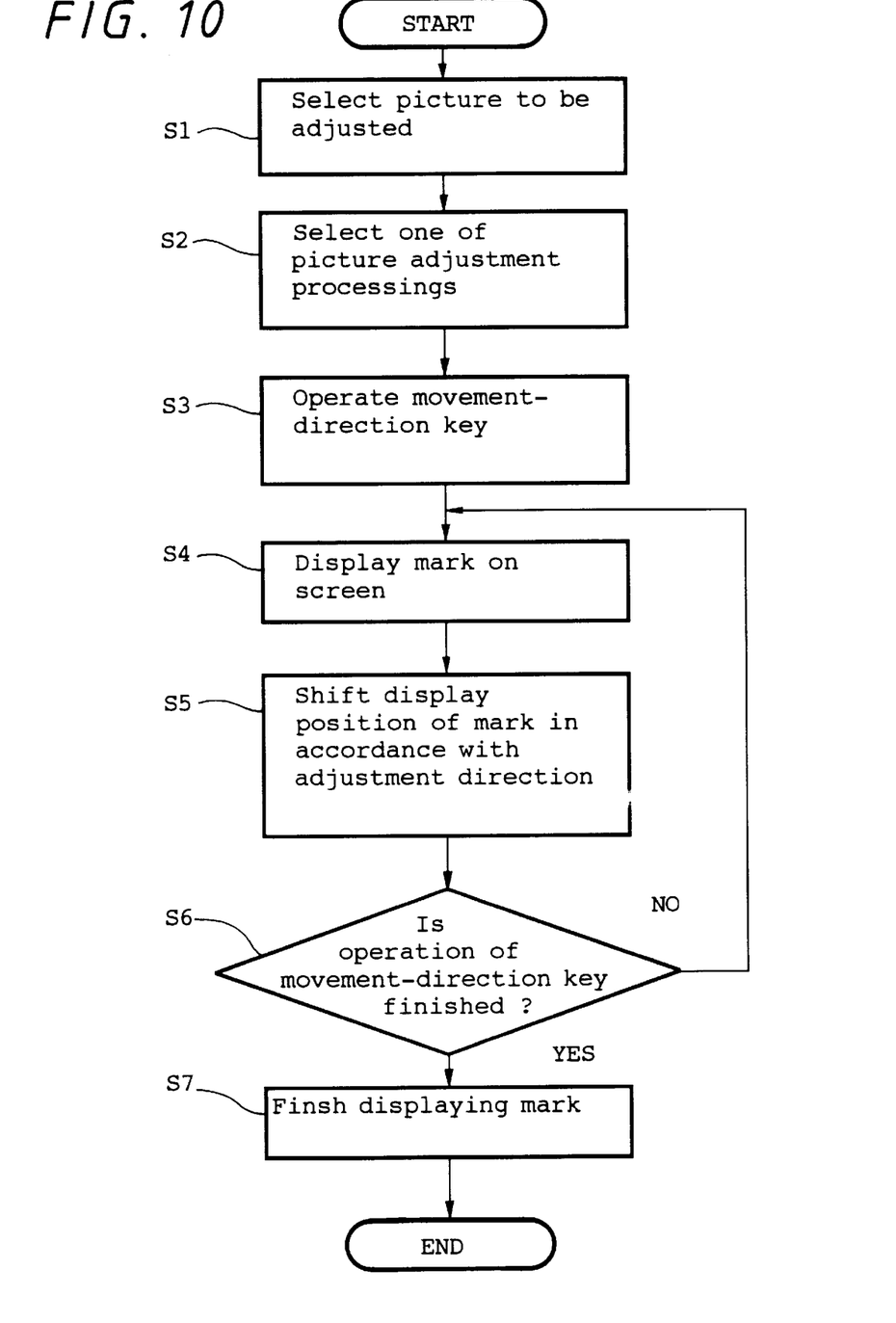
FIG. 10 is a flowchart used to explain a processing for displaying a mark.

There will be described with reference to FIG. 10 which is a flowchart a processing of adjusting a picture by superposing the mark data $M_{D1}$, $M_{D2}$ on the correction data to display the mark M on the screen.

This processing will hereinafter be described with reference to the flowchart on the assumption that the mark M is displayed only while the movement-direction selection keys L, R are being operated and that two left and right pictures A, B are adjusted as shown in FIG. 9.

In step S1, any of the picture selection keys 32a, 32b, 32c is operated to select a picture whose edge portion is to be adjusted. The process proceeds to step S2, wherein any of the SEM selection keys 33a, 33b, 33c is operated to select one of the picture adjustment pressings for setting the correction start and end points and inclination of the curve of the luminance level. The process proceeds to step S3, wherein any one of the movement-direction keys L and R is selected and operated. The process proceeds to step S4, wherein the SEM apparatus 30 starts the processing of adjusting the picture and at the same time superposes the correction data on the correction data to display the mark M.

When, for example, the picture A is selected by operating the picture selection key 32a and the processing of adjusting the correction start point $A_E$ is selected by operating the SEM selection key 33a, if the movement-direction key L is operated, then the process proceeds to step S5, wherein the correction start point $A_E$ is moved in the left direction and a displayed position of the mark M is also moved in the left direction.

Then, the process proceeds to step S6, wherein it is determined whether or not the movement-direction key L or R is being operated. If it is determined in step S6 that the movement-direction key L or R is being operated, then the SEM apparatus 30 continues displaying the mark M by repeating the processings in steps S4 to S5. If on the other hand it is determined in step S6 that operation of the movement-direction key L or R is finished, then the process proceeds to step S7, where the SEM apparatus 30 stops displaying the mark M.

Specifically, since the SEM apparatus 30 stops displaying the mark M when the adjustment is finished in this embodiment, it is possible to prevent the mark M from interfering with the user's visual confirmation of the adjusted picture.

When the SEM apparatus 30 continues displaying the mark M only for a predetermined time period after it is determined in step S6 that the operation of the movement-direction key L or R is finished, the mark M may be erased in step S7 after a predetermined time period is counted by a timer means or the like.

When the operation keys dedicated for displaying and erasing the mark M are provided, the mark M may be displayed by operating a mark display key at an optional timing before the movement-direction key is operated in step S3 and the display of the mark M may be finished in step S7 by manually operating the mark erasing key.

As described above, according to the present invention, since the stripe mark M is displayed on the screen 50 at the correction start point $A_E$ and the correction end point $B_S$ used for correcting the luminance level at the overlapped portion Q produced when the synthesized picture is formed, it is possible for the user to visually confirm the boundary between the overlapped portion Q and the normal portion where the projected pictures are not overlapped. Therefore, the operation for the picture adjustment is facilitated and efficiency in the picture adjustment is improved.

Moreover, since the synthesized-picture projecting apparatus and the picture adjusting method according to the present invention does not require a device, such as a personal computer or the like, or a software for adjusting the picture, it is possible to simplify the system for adjusting the picture, and to improve versatility of the synthesized-picture projecting apparatus and the picture adjusting method according to the present invention.

According to the present invention, since the picture adjustment can be carried out by operating the remote controller unit 31 connected to the SEM apparatus (video signal processing unit) 30, even if setting conditions or the like prevent the SEM apparatus 30 from being located at a place suitable for the user's monitoring the picture projected on the screen, it is possible to carry out the precise adjustment of the picture by the user's bringing only the remote controller unit to an optimum position for the picture adjustment.

Therefore, it is unnecessary for the user to go back and forth between the SEM apparatus 30 and the optimum place for the use's monitoring the projected picture, and it is possible for the user to visually confirm the result of the adjustment at the optimum place for visual confirmation of the picture. As a result, the easy and speedy operation for the adjustment can be obtained.

Having described a preferred embodiment of the present invention with reference to the accompanying drawings, it is to be understood that the present invention is not limited to the above-mentioned embodiment and that various changes and modifications can be effected therein by one skilled in the art without departing from the spirit or scope of the present invention as defined in the appended claims.

What is claimed is:

1. A synthesized-picture projecting apparatus comprising:
 a video signal processing unit including:
  a synchronizing signal separation unit for extracting a synchronization information of an input video signal;
  a frequency measuring unit for detecting a horizontal synchronizing frequency of said input video signal from said synchronization information;
  a memory unit for storing correction data used for correcting at least a video signal of one horizontal scanning line amount corresponding to said horizontal synchronizing frequency;
  a correction data calculating unit for calculating said correction data stored by said memory unit having a correction start point and/or a correction end point at predetermined positions in response to said horizontal synchronizing frequency;
  a mark data generating unit for automatically superposing mark data used for displaying a mark representing said correction start point and/or said correction end point on said correction start point and said correction end point of said correction data;
  an operation unit for supplying a command to read said correction data stored by said memory unit for a picture adjustment; and
 two projecting units or more for projecting, on a screen, pictures obtained from two video signals or more formed by said video signal processing unit, wherein, when positions of said correction start point and/or said correction end point of said correction data are adjusted by operating said operation unit, said mark data is superimposed on said correction start point and/or said correction end point of said correction data, thereby displaying said mark which is automatically superposed on said correction start point and/or said correction end point together with the projected picture on said screen
 wherein a luminance level for a second screen portion comprising one of said pictures gradually lowers from the correction start point to the correction end point and a luminance level for a first screen portion comprising the other of said pictures gradually increases from the correction start point to the correction end point and wherein said first and second screen portions have overlapping regions.

2. A synthesized-picture projecting apparatus according to claim 1, wherein said operation unit is a remote operating unit coupled to said video signal processing unit.

3. A picture adjusting method employed when two projecting means or more projects two pictures or more obtained from two video signals or more and said projected pictures at an overlapped portion thereof are adjusted, comprising the steps of:
 selecting a picture to be adjusted from said projected pictures; selecting one of processings for adjusting a correction start point of a correction data, adjusting a correction end point thereof and adjusting an inclination of a correction curve thereof to be used for a picture adjustment; and
 automatically superposing mark data on a correction start point and/or a correction end point of said correction data to display a mark formed based on said mark data on said screen together with said projected pictures
 wherein a luminance level for a second screen portion comprising one of said two pictures gradually lowers from the correction start point to the correction end point and a luminance level for a first screen portion comprising the other of said two pictures gradually increases from the correction start point to the correction end point.

4. A synthesized-picture projecting apparatus for projecting a synthesized picture formed of a plurality of screen portions corresponding to different video signals, wherein said screen portions have overlap regions where said screen portions overlap, a respective overlap region having a correction start point where a first screen portion begins and a correction end point where a second screen portion ends, said apparatus comprising:
 projecting means for projecting, at a luminance level, said screen portions;
 marking means for automatically marking a mark at said correction start point and said correction end point;
 soft edge matching means for adjusting an inclination of said luminance level of said respective overlap region such that said luminance level for said second screen portion gradually lowers from said correction start point to said correction end point and said luminance level for said first screen portion gradually increases from said correction start point to said correction end point; and selection means for selecting between manually setting said correction start point, said correction end point and said inclination of said luminance level, wherein said marking means automatically marks said correction start point and said correction end point as manually set.

5. The apparatus of claim 4, wherein said selection means is a remote control unit which sends wireless commands to set said correction start point, said correction end point and said inclination of said luminance level.

6. The apparatus of claim 4, wherein each video signal includes horizontal synchronization signals; and further comprising frequency detecting means for detecting a horizontal synchronizing frequency for each video signal.

7. The apparatus of claim 6, further comprising means for synchronizing the rate at which said projecting means projects said screen portions of each video signal when it is detected by said frequency detecting means that said horizontal synchronizing frequency varies between said video signals.

8. The apparatus of claim 4, wherein said marking means displays a white mark.

9. The apparatus of claim 4, wherein said marking means is manually turned on/off to display/hide said mark.

10. A synthesized-picture projecting apparatus for projecting a synthesized picture formed of a plurality of screen portions corresponding to different video signals, wherein said screen portions have overlap regions where said screen portions overlap, a respective overlap region having a correction start point where a first screen portion begins and a correction end point where a second screen portion ends, said apparatus comprising:

a plurality of projectors projecting, at a luminance level, said screen portions;

a marking unit automatically marking a mark at said correction start point and said correction end point;

a soft edge matching circuit adjusting an inclination of said luminance level of said respective overlap region such that said luminance level for said second screen portion gradually lowers from said correction start point to said correction end point and said luminance level for said first screen portion gradually increases from said correction start point to said correction end point; and a selector manually selecting between manually setting said correction start point, said correction end point and said inclination of said luminance level, wherein said marking unit automatically marks said correction start point and said correction end point as manually set.

11. The apparatus of claim 10, wherein said selector is a remote control unit which sends wireless commands to set said correction start point, said correction end point and said inclination of said luminance level.

12. The apparatus of claim 10, wherein each video signal includes horizontal synchronization signals; and further comprising a frequency detector detecting a horizontal synchronizing frequency for each video signal.

13. The apparatus of claim 12, further comprising a synchronizing circuit synchronizing the rate at which said projectors project said screen portions of each video signal when it is detected by said frequency detector that said horizontal synchronizing frequency varies between said video signals.

14. The apparatus of claim 10, wherein said marking unit displays a white mark.

15. The apparatus of claim 10, wherein said marking unit is manually turned on/off to display/hide said mark.

16. A synthesized-picture projecting method for projecting a synthesized picture formed of a plurality of screen portions corresponding to different video signals, wherein said screen portions have overlap regions where said screen portions overlap, a respective overlap region having a correction start point where a first screen portion begins and a correction end point where said second screen portion ends, said method comprising the steps of:

projecting, at a luminance level, said screen portions;

automatically marking a mark at said correction start point and said correction end point;

adjusting an inclination of said luminance level of said respective overlap region such that said luminance level for said second screen portion gradually lowers from said correction start point to said correction end point and said luminance level for said first screen portion gradually increases from said correction start point to said correction end point; and selecting between manually setting said correction start point, said correction end point and said inclination of said luminance level, wherein said step of marking automatically marks said correction start point and said correction end point as manually set.

17. The method of claim 16, wherein said step of selecting sends wireless commands to set said correction start point, said correction end point and said inclination of said luminance level.

18. The method of claim 16, wherein each video signal includes horizontal synchronization signals; and further comprising the step of detecting a horizontal synchronizing frequency for each video signal.

19. The method of claim 18, further comprising the step of synchronizing the rate at which said screen portions of each video signal are projected when it is detected that said horizontal synchronizing frequency varies between said video signals.

20. The method of claim 16, wherein said step of marking displays a white mark.

21. The method of claim 16, further comprising the step of manually turning on/off said mark to display/hide said mark.

* * * * *